United States Patent
Ranmuthu

(10) Patent No.: US 6,728,056 B2
(45) Date of Patent: Apr. 27, 2004

(54) CURRENT STEALING CIRCUIT TO CONTROL THE IMPEDANCE OF A TGMR HEAD AMPLIFIER BIASING CIRCUIT REGARDLESS OF WHETHER THE HEAD AMPLIFIER IS TURNED ON

(75) Inventor: Indumini W. Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 199 days.

(21) Appl. No.: 09/683,572

(22) Filed: Jan. 21, 2002

(65) Prior Publication Data

US 2003/0123177 A1 Jul. 3, 2003

Related U.S. Application Data

(60) Provisional application No. 60/319,050, filed on Dec. 28, 2001.

(51) Int. Cl.⁷ ................................................. G11B 5/03
(52) U.S. Cl. ........................ 360/66; 360/46; 327/307
(58) Field of Search .............................. 360/66, 67, 46; 327/110, 307

(56) References Cited

U.S. PATENT DOCUMENTS 6,271,977 B1 * 8/2001 Chung et al. ................. 360/46
6,377,412 B1 * 4/2002 Freitas ........................ 360/46

* cited by examiner

Primary Examiner—David Hudspeth
Assistant Examiner—Natalia Figueroa
(74) Attorney, Agent, or Firm—W. Daniel Swayze, Jr.; W. James Brady; Frederick J. Telecky, Jr.

(57) ABSTRACT

An impedance controlling circuit (152) is connected across an MR head (42) and has two current paths, each including a control transistor (154,156), a current path resistor (160, 158), and a biasing circuit (162,164) in series. Each side of the MR head 42 is connected between a respective one of the current path resistors (158,160) and the biasing circuits (162,168). A shunt resistor (170) is connected between the control transistors (154,156) and the current path resistors (158,160) in each of the current paths. When the control transistors (154,156) are not conducting, the current path resistors (158,160) and the shunt resistor (170) shunt the MR head (42).

12 Claims, 2 Drawing Sheets

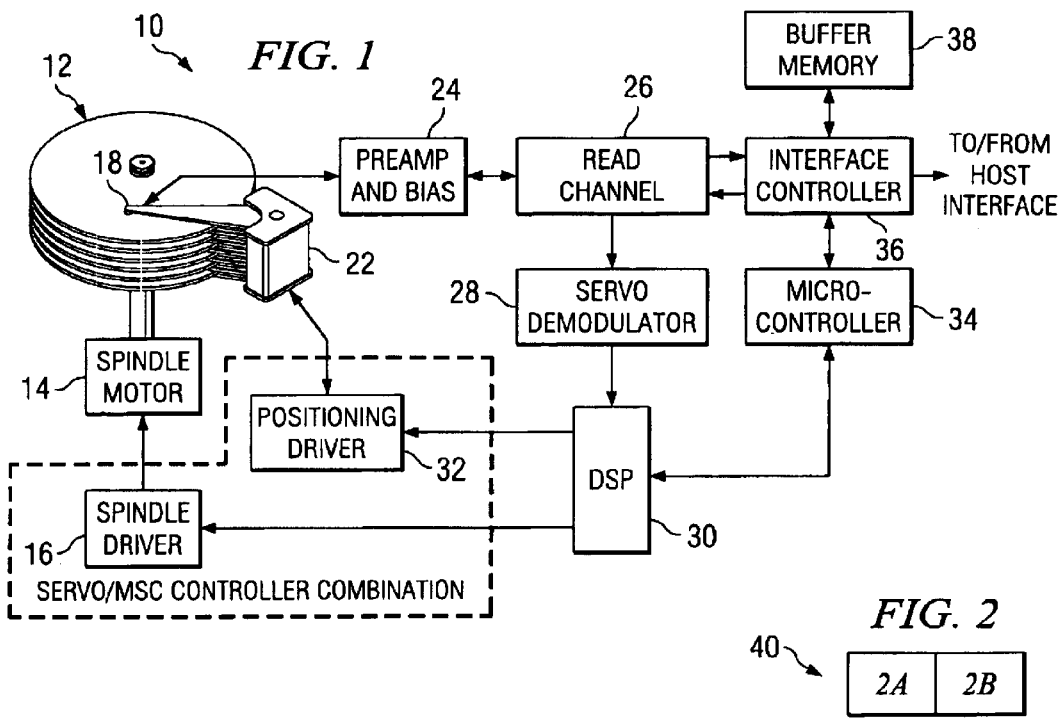
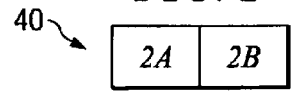
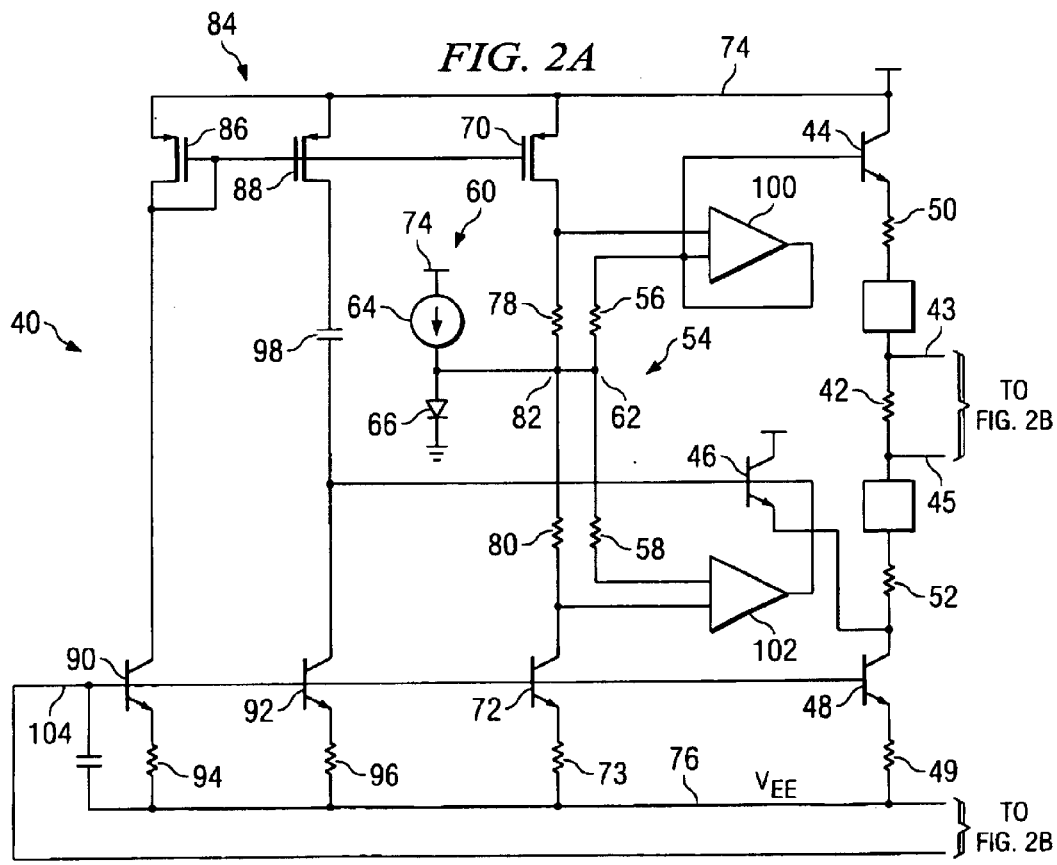

CURRENT STEALING CIRCUIT TO CONTROL THE IMPEDANCE OF A TGMR HEAD AMPLIFIER BIASING CIRCUIT REGARDLESS OF WHETHER THE HEAD AMPLIFIER IS TURNED ON

BACKGROUND OF INVENTION

1. Field of Invention

This invention relates to improvements in methods and apparatuses for dynamic information storage or retrieval, and more particularly to improvements in methods and circuitry for biasing a data transducer, or head, amplifier used in mass data storage devices, hard disk drive devices, or the like, and still more particularly to improvements in driver circuitry and methods for biasing an amplifier for a tunneling giant magneto-resistive (TGMR) type of such data transducer.

2. Relevant Background

Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Many applications are still being developed. Applications for hard disk drives are increasing in number, and are expected to further increase in the future.

Typically, in the construction of a hard disk drive, a data transducer, or head is located in proximity to a spinning platter, or disk, on which a magnetic material has been emplaced. The magnetic material contains a pattern of rings along which the domains of the magnetic material are selectively oriented in accordance with the recorded data, so that as the head flies over the magnetic material and along the rings, it can detect the orientation of the domains to enable the data to be read and decoded.

Recently, magneto-resistive (MR) heads have been finding increasing use in such disk drive applications. The term "magneto-resistive" refers to the change in resistivity of metals in the presence of a magnetic field. MR heads are gaining popularity primarily because MR heads efficiently convert magnetization changes into sufficiently high current or voltage with a minimum amount of noise, detect signals at high densities with a negligible loss in signals, and are cost-effective.

Moreover, MR-sensor technology is extendable to very high disk drive densities. Among the many advantages of the MR heads is the fact that they are essentially independent of the velocity of the disk medium, because they measure the flux from the medium, in contrast, for example, to inductive heads, which measure the change in flux with time. They can therefore find wide use in such applications as lap top computers, which have a relatively slowly rotating hard disk, as well as in high-end personal computers, which have rapidly rotating disks.

Very recently, tunneling, giant, magneto-resistive (TMGR) heads have been introduced, which are also gaining widespread popularity. TGMR heads are capable of detecting extremely feeble magnetic signals, using a ferro-magnetic tunneling effect to produce a current flow that significantly reduces the resistance of the head. However, unlike normal MR heads, which have resistances in the range of about 30 to 60 ohms, TGMR heads have resistances about 10 times as large, for example, in the range of about 300 to 600 ohms. Consequently, MR typical head biasing circuits experience difficulties in biasing such TGMR heads.

For example, the head amplifier may be overbiased using the same circuit that was used for an ordinary MR head. Also, due to the increased resistance of the head, the time constants to charge the various parts of the biasing circuitry have larger time constants, and therefore, take longer to respond to changes, particularly on power up or turn-on of the circuit.

What is needed, therefore, is a biasing circuit that can be used in conjunction with a TGMR head amplifier that has reduced time constants, and which is not susceptible to overbiasing the head amplifier.

SUMMARY OF INVENTION

In light of the above, therefore, it is an advantage of the invention that the impedance of the MR head circuit can be controlled to be a relatively constant value regardless of whether the MR head amplifier is turned on or off.

It is another advantage of the invention that the current that flows in an MR head remains relatively constant when the head is turned on or off in operation.

It is another advantage of the invention that current spikes that normally occur when an MR head amplifier is turned on or off are reduced or eliminated.

It is yet another advantage of the invention that since current spikes and high currents that otherwise may flow in the head are reduced or eliminated, risk of damage to the MR head from such currents is also reduced or eliminated.

These and other objects, features, and advantages will become apparent to those skilled in the art from the following detailed description, when read in conjunction with the accompanying drawings and appended claims.

According to a broad aspect of the invention, an impedance controlling circuit is provided for connection across an MR head. The MR head may be, for example, a TGMR head, and may have a resistance of, for instance, about 600 ohms. The circuit includes two current paths, each including a control transistor, a current path resistor, and a biasing circuit in series. Each side of the MR head is connected between a respective one of the current path resistors and the biasing circuits. A shunt resistor is connected between respective nodes between the control transistors and the current path resistors in each of the current paths, so that when the control transistors are conducting, the current path resistors and the shunt resistor shunt the MR head.

According to another broad aspect of the invention, an impedance controlling circuit is provided for connection across a TGMR head. The circuit includes A TGMR head and a current stealing circuit connected to the TGMR head that operates to conduct an amount of current through the TGMR head when the TGMR head amplifier is turned off that is substantially equal to a current in the TGMR head when the TGMR head amplifier is turned on. The impedance controlling circuit may include a resistor connected between a pair of TGMR head biasing current paths that operate when the TGMR head amplifier is turned on, whereby the resistor provides a current flow path through the pair of TGMR head biasing current paths when the TGMR head amplifier is turned off.

According to yet another broad aspect of the invention, a method is presented for operating a mass data storage device. The method includes providing a magnetic media on which data may be selectively written, providing a TGMR head in proximity to the magnetic media for at least reading data from the magnetic media, and providing a current stealing circuit in connection with the TGMR head amplifier that operates to conduct an amount of current through the TGMR head when the TGMR head amplifier is turned off that is substantially equal to a current in the TGMR head when the TGMR head amplifier is turned on. The providing a current stealing circuit may include providing a resistor between a pair of TGMR head biasing current paths that operate when the TGMR head amplifier is turned on, whereby the resistor provides a current flow path through the pair of TGMR head biasing current paths when the TGMR head amplifier is turned off.

According to yet another broad aspect of the invention, a mass data storage device is presented. The mass data storage device has a magnetic media on which data may be selectively written and a TGMR head in proximity to the magnetic media for at least reading data from the magnetic media. A current stealing circuit is in connection with the TGMR head that operates to conduct an amount of current through the TGMR head when the TGMR head amplifier is turned off that is substantially equal to a current in the TGMR head when the TGMR head amplifier is turned on. The current stealing circuit may include a resistor between a pair of TGMR head biasing current paths that operate when the TGMR head amplifier is turned on, whereby the resistor provides a current flow path through the pair of TGMR head biasing current paths when the TGMR head amplifier is turned off.

BRIEF DESCRIPTION OF DRAWINGS

The invention is illustrated in the accompanying drawings, in which:

FIG. 1 is a block diagram of a generic disk drive system, illustrating the general environment in which the invention may be practiced.

In the various figures of the drawing, like reference numerals are used to denote like or similar parts.

DETAILED DESCRIPTION

Figure 2B:
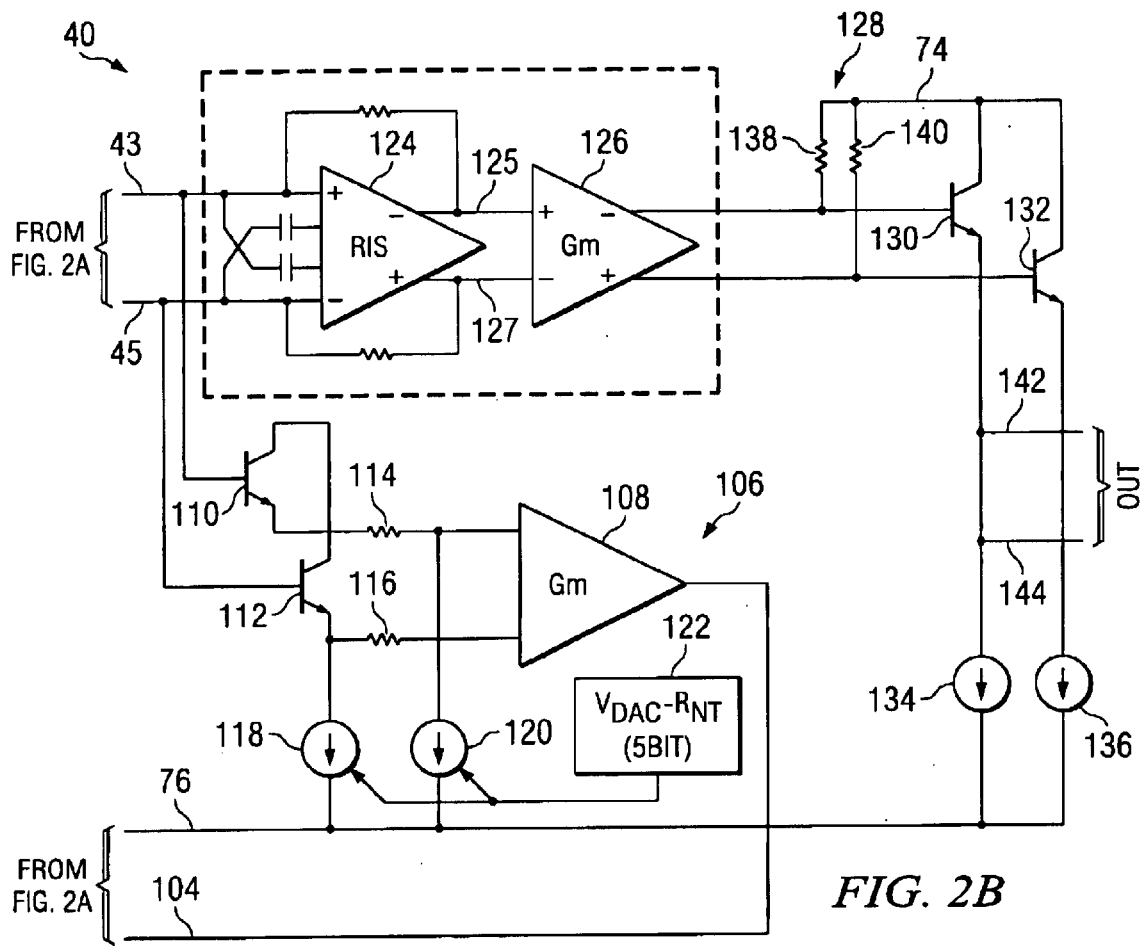
FIG. 2 is an electrical schematic diagram of an MR head amplifier biasing circuit in accordance with a preferred embodiment of the invention.

A preferred embodiment of the invention is illustrated in the accompanying drawings, to which reference is now made. A block diagram of a generic disk drive system 10, which represents the general environment in which the invention may be practiced, is shown in FIG. 1. The system 10 includes a magnetic media disk 12 that is rotated by a spindle motor 14 and spindle driver circuit 16.

A data transducer or head 18 is locatable along selectable radial tracks (not shown) of the disk 12 by a voice coil motor (VCM) 22. The radial tracks may contain magnetic states that contain information about the tracks, such as track identification data, location information, synchronization data, as well as user data, and so forth. The head 18 is used both to record user data to and read user data back from the disk, as well as to detect signals that identify the tracks and sectors at which data is written, and to detect servo bursts that enable the head to be properly laterally aligned with the tracks of the disk. The head 18 may be, for example, of the so-called tunneling, giant, magneto-resistive (TGMR) type, having a resistance of between about 300 ohms and 600 ohms.

Analog electrical signals that are generated by the head 18 in response to the magnetic information recorded on the disk are preamplified by a preamplifier 24 for delivery to read channel circuitry 26. The preamplifier 24 may also include a head biasing circuit, which may be constructed in accordance with the invention, as described below in detail.

Servo signals that are prerecorded on the disk 12 are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP 30 for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12.

With additional reference now to FIG. 2, according to a preferred embodiment of the invention, an MR head biasing circuit 40 is presented. As shown in FIG. 2A, the MR head biasing circuit 40 has an MR head 42, which may be a TGMR head if desired, although the circuit 40 may be used with other types of MR heads, as well. The output from the circuit 40 is developed across the MR head 42 on output lines 43 and 45.

A first pair of current control devices 44 and 46 are connected on respective opposite sides of the MR head 42 to establish a current flow path therethrough. The current control devices 44 and 46 may be, for example, PNP transistors, as shown. A biasing transistor 48, which also may be a PNP transistor is connected in the flow path to conduct a current, for example, of twice the current flowing in either transistor 44 or 46. A bias resistor 49 is connected between the emitter of the transistor 48 and a reference potential line 76, in the circuit illustrated the reference potential being set at $V_{EE}$. An additional pair of resistors 50 and 52, preferably of equal value, are connected in the current flow path on respective opposite sides of the MR head 42.

A circuit 54 is provided that includes a pair of equal valued resistors 56 and 58 connected in series between control elements of the first pair of control devices 44 and 48, and a reference voltage generator 60 is connected to establish a reference voltage at a node 62 between the first pair of resistors 56 and 58 to establish the reference voltage within a resistance of said MR head 42, preferably in the middle thereof. The reference voltage generator 60 includes a current source 64 in series with a diode 66 between a voltage supply line 74 and a reference potential, or ground, as shown.

A second pair of current control devices 70 and 72 are provided connected respectively to the voltage supply line 74 and to a reference potential line 76. In the embodiment illustrated, current control device 70 is a PMOS device and current control device 72 is a PNP transistor. A bias resistor 73 is provided between the emitter of the PNP transistor 72 and the reference potential line 76.

A second pair of resistors 78 and 80 is connected in series between said second pair of current control devices, and more particularly, between the drain of the PMOS device 70 and the collector of the PNP transistor 72 so that the PMOS device 70 the PNP transistor 72 control the current through the resistors 78 and 80. A node 82 between the second pair of resistors 78 and 80 is connected to the node 62 between the first pair of resistors 56 and 58. As will become apparent, the second set of resistors 78 and 80 develop a voltage thereacross that corresponds to the desired voltage to be established on the control elements of the transistors 44 and 46 that control the current through the head 42. This voltage is used as a target voltage against which the actual control voltage may be compared.

An initial current mirror 84 supplies a bias control voltage to the second pair of current control devices 70 and 72. More particularly, the current mirror 84 includes a pair of PMOS devices 86 and 88, together with a pair of PMP transistors 90 and 92 between the power supply rail 74 and the reference potential line 76. A pair of bias resistors 94 and 96 are connected between the respective emitters of transistors 90 and 92 and the reference potential line 76. A capacitor 98 is provided between the drain of PMOS device 88 and the collector of PNP transistor 92 to buffer voltage changes in the current mirror 84.

It should be noted that although the capacitor 98 and other capacitive elements of the circuit 40 aid the operation of the circuit 40, they also present the circuit with elements that need to be charged, for example, when the head 42 is turned on. As a result, when the amplifier of the head 42 is turned on, the voltage that is applied takes some time to reach the desired operating voltage level due to the charge time required by the capacitive elements. This results in voltage spikes, ringing, and reduction in the phase margin of the circuit.

To address this problem, a pair of comparators 100 and 102 are provided. Each comparator 100 and 102 is connected to compare a voltage on respective ends of the first and second pairs of resistors. More particularly, comparator 100 compares the voltages on the top ends of resistors 78 and 56, and comparator 102 compares the voltages on the bottom ends of resistors 80 and 58. Each comparator 100 and 102 provides an output to respective control elements of the first pair of control devices 44 and 46. Thus, in operation, the comparators 100 and 102 provide drive current to the control elements of the first pair of control devices 44 and 46 in proportion to the voltage difference on the respective ends of the first and second pairs of resistors 78 and 56 and resistors 80 and 58. Therefore, the further the voltage on said respective ends of said first and second pairs of resistors 78,56 and 80,58 departs from zero, the larger the drive current. It should be noted that the voltage difference between the top ends of resistors 78 and 56 and of resistors 80 and 58 is zero when the voltage applied to the control elements of current control devices 44 and 46 are equal to the target voltage established across the resistors 78 and 80, as mentioned above.

The bias voltage that is applied to the bias transistors 90, 92, 72, and 48 on line 104 is derived from a fast recovery circuit 106, shown in FIG. 2B, to which reference is now additionally made. The fast recovery circuit 106 includes a transconductance amplifier 108 that receives signals on output lines 43 and 45 from the MR head 42 shown in FIG. 2A. The signals on lines 43 and 45 are applied to the inputs of the transconductance amplifier 108 by a pair of emitter follower PNP transistors 110 and 112 via resistors 114 and 116. A pair of current sources 118 and 120 set the input voltage to the transconductance amplifier 108 as determined by a current control register 122. The output from the transconductance amplifier 108 is fed back to bias the biasing transistors 90, 92, 72, and 48 on line 104, as above described.

The MR head signals on lines 43 and 45 are amplifier by a reader input stage (RIS) 124, details of which are shown and described in detail in conjunction with FIG. 3 below. The RIS stage 124 may be a differential amplifier, as shown, having its differential outputs connected to a transconductance amplifier 126. The differential output from transconductance amplifier 126 is connected to an output stage 128, which includes a pair of PNP transistors 130 and 132 connected between a voltage supply rail 74 and the reference potential line 76 by respective current sources 134 and 136. A pair of pull-up resistors 138 and 140 are connected from the respective bases of transistors 130 and 132 to the voltage supply rail 74. The output of the circuit is derived on lines 142 and 144 for delivery to additional amplification circuitry, if desired.

Figure 3:
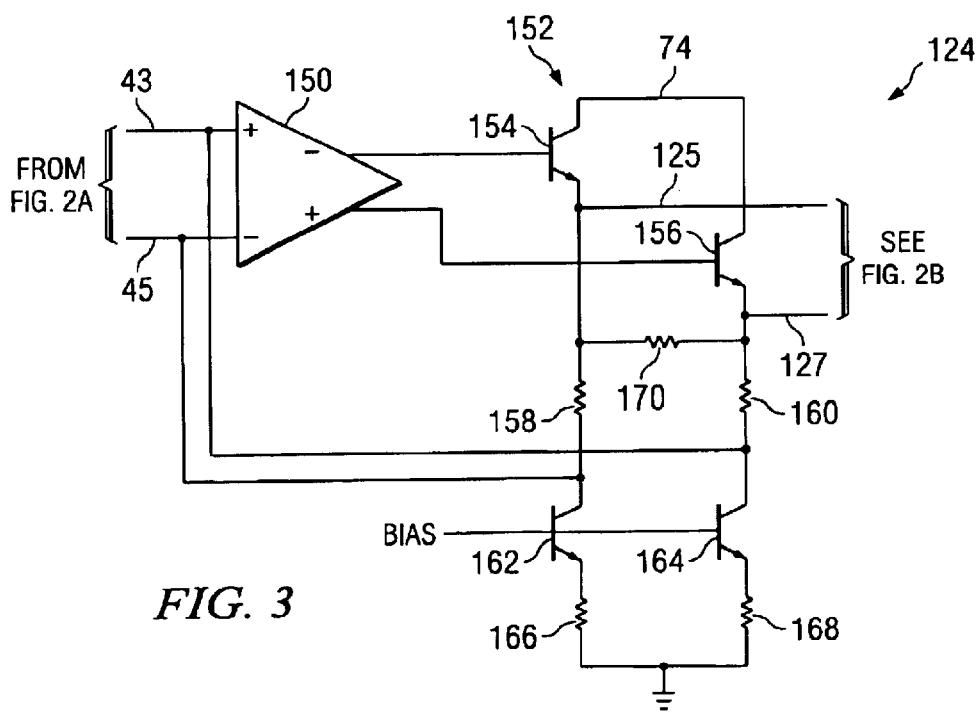
FIG. 3 is a detailed electrical schematic diagram of the reader input stage (RIS) of the amplifier biasing circuit of FIG. 2.

With reference additionally now to FIG. 3, details of the RIS circuit 124, according to a preferred embodiment of the invention are shown. The RIS circuit 124 includes a differential amplifier 150 that receives the signals from the MR head 42 on lines 43 and 45. The output from the differential amplifier 150 is connected to an impedance controlling circuit 152, which includes a pair of current controlling devices 154 and 156. In the circuit illustrated, current controlling devices 154 and 156 are PNP transistors.

Impedance controlling resistors 158 and 160 are provided, connected respectively to input lines 43 and 45. Biasing transistors 162 and 164, together with biasing resistors 166 and 168 are provided to complete the current paths between the voltage supply rail 74 and a reference potential, or ground, as shown. According to a preferred embodiment of the invention, an additional impedance controlling resistor 170 is provided between the emitters of transistors 154 and 156.

In operation, it can be seen that when the MR head amplifier is turned on and transistors 154 and 156 are conducting, current flows through resistors 158 and 160. Since resistors 158 and 160 effectively shunt the MR head 42, this has the effect of stealing a portion of the head current, and is a known impedance controlling effect. However, when the MR head 42 ceases to conduct, current ceases to flow in resistors 158 and 160. This produces a temporary increase in head current in the MR head 42, which may result in excessive currents flowing in the head that may, in fact, damage the head.

As a result of the added impedance controlling resistor 170, however, when the transistors 154 and 156 are turned off, resistors 158 and 160 still shunt the head, and current is still allowed to flow therein. Consequently, the large turn-on and turn-off current spikes are not produced in the MR head 42.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. An impedance controlling circuit connected across an MR head, comprising:

two current paths, each including a control transistor, a current path resistor, and a biasing circuit in series;

each side of said MR head being connected between a respective one of said current path resistors and said biasing circuits;

and a shunt resistor connected between respective nodes between said control transistors and said current path resistors in each of said current paths;

wherein when said control transistors are not conducting, said current path resistors and said shunt resistor shunt said MR head.

2. The impedance controlling circuit of claim 1 wherein said MR head has a resistance of about 600 ohms.

3. The impedance controlling circuit of claim 1 wherein said MR head is a TGMR head.

4. The impedance controlling circuit of claim 1 wherein said MR head has a resistance of about 60 ohms.

5. An impedance controlling circuit connected across a TGMR head, comprising:
   a TGMR head;
   a TGMR head amplifier connected across said TGMR head;
   a current stealing circuit connected to said TGMR head that operates to conduct an amount of current through said TGMR head when said TGMR head amplifier is turned off that is substantially equal to a current in said TGMR head when said TGMR head amplifier is turned on.

6. The impedance controlling circuit of claim 5, wherein said current stealing circuit comprises a resistor connected between a pair of TGMR head biasing current paths that operate when said TGMR head amplifier is turned on, whereby said resistor provides a current flow path through said pair of TGMR head biasing current paths when said TGMR head amplifier is turned off.

7. The impedance controlling circuit of claim 5 wherein said TGMR head has a resistance of about 600 ohms.

8. A method for operating a mass data storage device, comprising:
   providing a magnetic media on which data may be selectively written;
   providing a TGMR head in proximity to said magnetic media for at least reading data from said magnetic media;
   providing a TGMR head amplifier connected to said TGMR head; and
   providing a current stealing circuit in connection with said TGMR head that operates to conduct an amount of current through said TGMR head when said TGMR head amplifier is turned off that is substantially equal to a current in said TGMR head when said TGMR head amplifier is turned on.

9. The method of claim 8, wherein said providing a current stealing circuit comprises providing a resistor between a pair of TGMR head biasing current paths that operate when said TGMR head amplifier is turned on, whereby said resistor provides a current flow path through said pair of TGMR head biasing current paths when said TGMR head amplifier is turned off.

10. A mass data storage device, comprising:
    a magnetic media on which data may be selectively written;
    a TGMR head in proximity to said magnetic media for at least reading data from said magnetic media;
    a TGMR head amplifier connected to said TGMR head;
    and a current stealing circuit in connection with said TGMR head that operates to conduct an amount of current through said TGMR head when said TGMR amplifier is turned off that is substantially equal to a current in said TGMR head when said TGMR head amplifier is turned on.

11. The mass data storage device of claim 10, wherein said current stealing circuit comprises a resistor between a pair of TGMR head biasing current paths that operate when said TGMR head amplifier is turned on, whereby said resistor provides a current flow path through said pair of TGMR head biasing current paths when said TGMR head amplifier is turned off.

12. The mass data storage device of claim 10 wherein said TGMR head has a resistance of about 600 ohms.

\* \* \* \* \*